UNITED STATES PATENT OFFICE 2,191,268

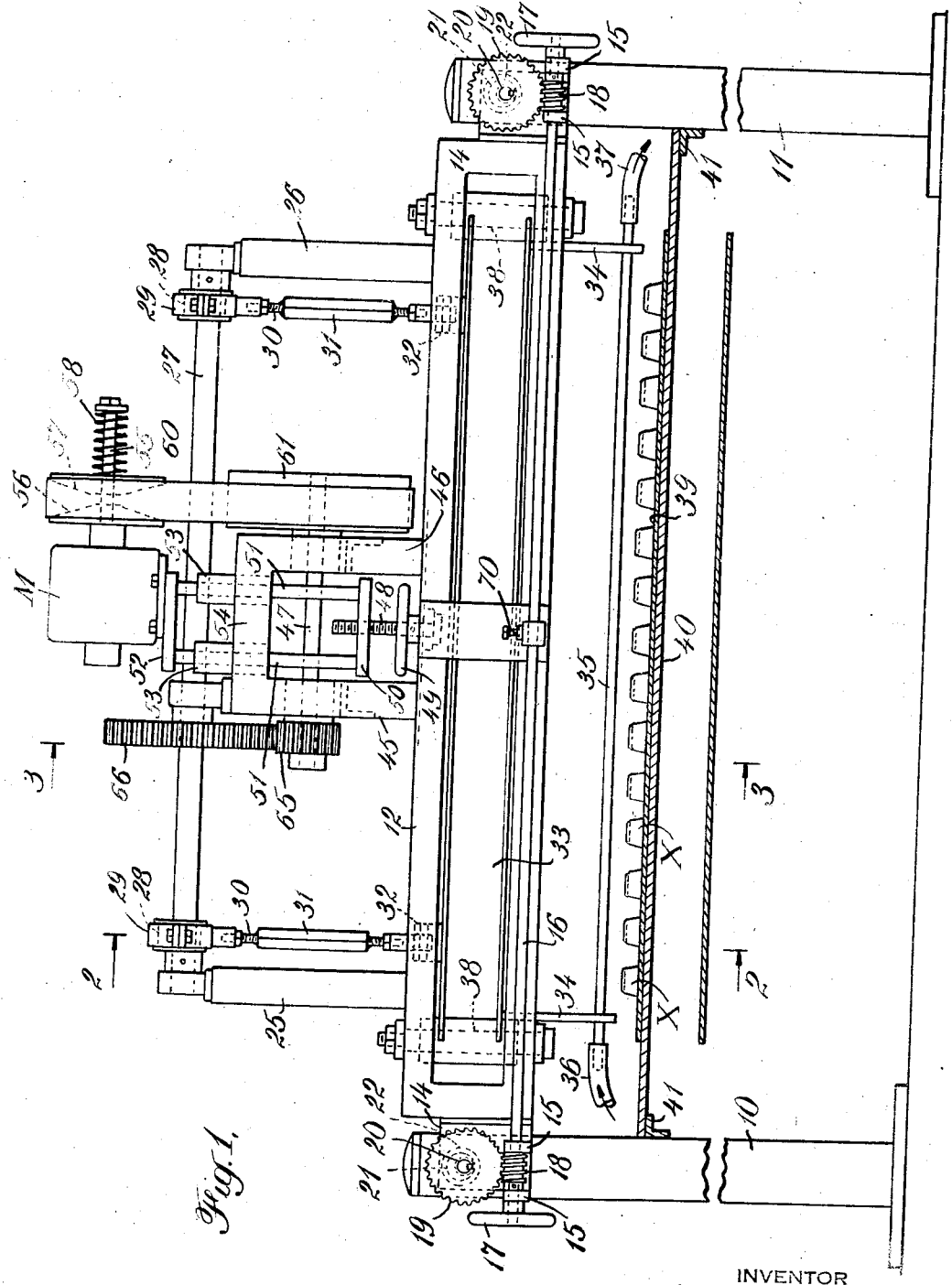
Feb. 20, 1940. L. H. ZEUN 2,191,268
MACHINE FOR PATTING CANDY
Filed April 11, 1939 2 Sheets-Sheet 1
INVENTOR
Louis H. Zeun
BY
Marshall & Hawley.
ATTORNEYS

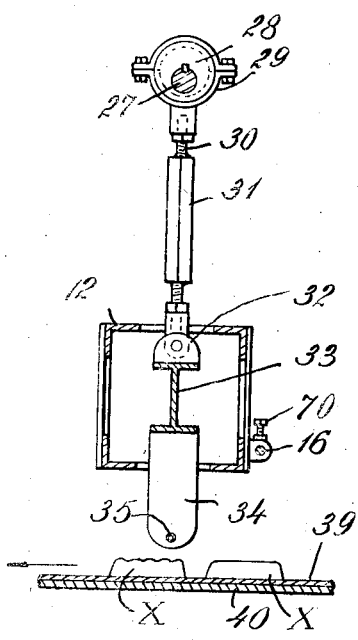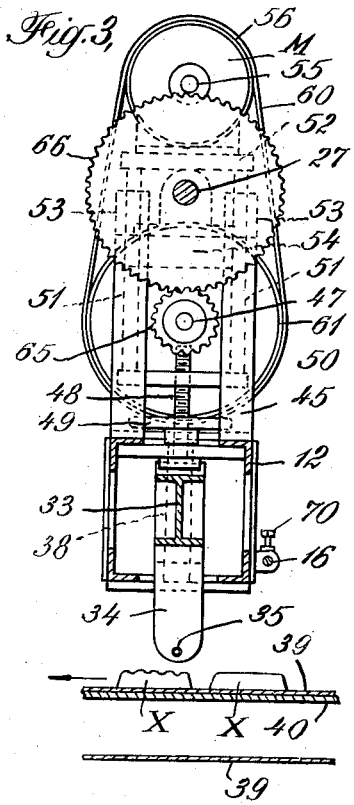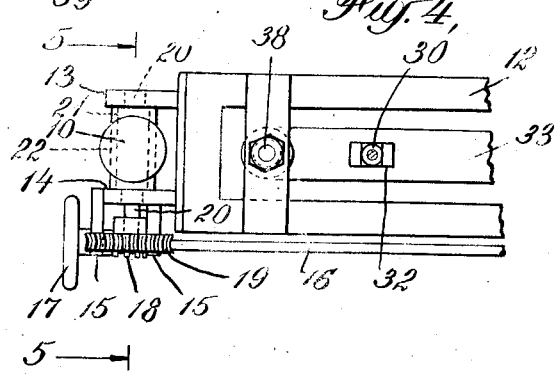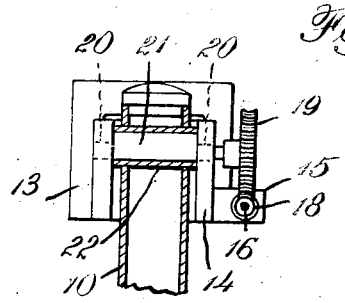

MACHINE FOR PATTING CANDY

Louis H. Zeun, Naugatuck, Conn., assignor to Peter Paul, Inc., Naugatuck, Conn., a corporation of Delaware Application April 11, 1939, Serial No. 267,242

7 Claims. (Cl. 107—7)

This invention relates to a machine for patting candy.

More particularly stated, the invention relates to a machine for patting candies, such for instance as chocolate or chocolate coated candy bars, to form a design on the bars and impart thereto an attractive and artistic appearance. Candy bars of this nature, as they come from the coater and before they are chilled, are still warm and plastic. They must therefore be handled with care. If the patting element is cold the chocolate will "freeze" to the patting member and if this member is too hot the fats and oils will be burned out and the chocolate will be scorched or burned.

This invention has for one of its objects to provide a device of the character described, so designed that a uniform artistic and attractive design will be formed on the candy.

Another object of the invention is to provide a device of the character specified so constructed and arranged that the rate of movement or reciprocation of the patting member can be varied.

Another object of the invention is to provide a machine of the character specified so designed that the depth of engagement of the patting member with the candy or candy bar can be regulated.

Another object of the invention is to provide a device of the character specified so constructed and arranged that the patting element can be maintained at the desired temperature for efficient operation.

Further objects of the invention will appear from the following specification taken in connection with the drawings which form a part of this application, and in which:

Fig. 1 is an elevational view of a machine constructed in accordance with the invention;

Fig. 2 is a vertical sectional elevation taken substantially on line 2—2 of Fig. 1;

Fig. 3 is a vertical sectional elevation taken substantially on line 3—3 of Fig. 1;

Fig. 4 is a fragmentary plan view of the left hand end of the machine shown in Fig. 1, illustrating the adjustment for varying the height of the operating mechanism; and Fig. 5 is a sectional view taken substantially on line 5—5 of Fig. 4.

The invention briefly described consists of a patting element which may have any desired form or shape and in connection with which means is provided for varying the temperature of this element to suit the conditions encountered. The patting element is supported above the path of travel of the candy bars to be operated upon and means is provided for regulating the height of this element or the distance between the element and the path of travel of the candy bars and also for varying the rate of vertical reciprocation of the element so that the number of "pats" can be regulated.

Further details of the invention will appear from the following description.

In the embodiment of the invention illustrated in the drawings, the mechanism is supported on a pair of upright posts or pedestals 10 and 11. The entire operating mechanism is mounted on and carried by a rectangular frame 12 which has secured thereto and extending laterally from the ends thereof brackets 13 and 14. The brackets 14 have secured thereto and projecting forwardly therefrom a pair of brackets 15 in which is mounted a shaft 16 that extends across the front of the machine. The shaft 16 has mounted on its ends a pair of hand wheels 17 and also has secured thereto worms 18. The worms 18 engage worm wheels 19 mounted on front shafts 20 supported in brackets 13 and 14. The shafts 20 are carried by and are eccentric to shafts 21 which are disposed in eccentric sleeves 22 mounted in posts 10 and 11. Thus, the shafts 20 which are mounted in brackets 13 and 14 act as cranks and as worm wheel 19 is rotated the cranks or shafts 20 are rotated. However, since shaft 21 is mounted in the post 10 or 11, the rotation of shafts 20 swings the cranks or shafts 20 relative to the shaft 21 and thus raises or lowers frame 12.

As one of the hand wheels 17 is turned the worms 18 will be rotated, thus turning the worm wheels 19 and turning the shafts 21 in the sleeves 22. This will cause the frame 12 which is carried by the brackets 13 and 14 to be vertically adjusted.

The frame 12 has mounted thereon vertical posts 25 and 26, on the upper ends of which is mounted a shaft 27. This shaft has secured thereto eccentrics 28 and eccentric straps 29 surround the eccentrics and have secured thereto downwardly extending links 30. These links are adjustable in length by turn-buckles 31 and the lower ends of the links have secured thereto brackets 32 which are carried by and extend upwardly from an eye bar 33. Bar 33 is guided by guide members 38 carried by frame 12. The bar 33 has secured thereto and extending downwardly therefrom straps 34, on the lower ends of which is mounted a tube 35. The tube 35 is hollow and has one end connected to an inlet pipe 36 and an outlet pipe 37 is connected to the other end thereof. In this manner liquid or water of any desired temperature can be circulated through the pipe or tube 35, the temperature of the circulating medium being varied to suit the conditions encountered. The tube or pipe 35 is the patting element and engages candy bars X which are fed on an endless conveyor 39, the upper lap of the conveyor being movable across a table or support 40 mounted on brackets 41 carried by the posts 10 and 11.

The rectangular frame 12 has secured to and extending upwardly therefrom brackets 45 and 46 in which is mounted a shaft 47. There is also mounted on the frame 12 a rotatable screw 48 which has secured thereto a hand wheel 49. The vertically adjustable frame, comprising a base 50, vertical posts 51 and a plate 52 secured to the upper ends of the posts 51 is mounted on and threaded to the screw 48, as shown in Figs. 1 and 3. The posts 51 are slidable in sleeves 53 carried by a cross frame member 54 which is secured to and carried by the brackets 45 and 46. A motor M is mounted on the plate 52 and the motor shaft 55 has splined thereon a pair of oppositely facing cone pulleys 56 and 57, the pulley 57 being pressed by a spring 58 in a direction toward the pulley 56.

A belt 60 is mounted between the pulleys 56 and 57 and is also mounted on a pulley 61 carried by the shaft 47. As the hand wheel 49 and screw 48 are rotated, the motor, motor shaft and pulleys 56 and 57 fill be adjusted toward and away from the pulley 61, thus causing the belt 60 to move inwardly or outwardly relative to the motor shaft and varying the drive between the shaft 55 and the shaft 47.

The drive just described is a Reeves drive and any other desired form of speed varying or speed changing transmission may be used if desired.

The shaft 47 has secured thereto on the end opposite the pulley 61 a gear wheel 65 which meshes with a gear wheel 66 secured to the shaft 27. Thus, the drive from the motor M is transmitted through the pulleys 56, 57, belt 60, pulley 61, shaft 47 and gear wheels 65 and 66 to the shaft 27.

As the shaft 27 is rotated the eccentrics 28 will vertically reciprocate the eye bar 33 and tube 35. As the tube is reciprocated it will move into and out of contact with the chocolate bars X, X which are being fed by the belt 39, thus imparting thereto a wavy appearance. It will be understood that the tube 35 may carry any desired design and impart this design to the candy bars.

The depth of penetration or engagement of the tube with the bars can be regulated by rotating the shaft 16 and when this shaft has been rotated to properly set the machine it can be fixed in this position by a set screw 70.

Although one specific embodiment of the invention has been particularly shown and described, it will be understood that the invention is capable of modification and that changes in the construction and in the arrangement of the various cooperating parts may be made without departing from the spirit and scope of the invention, as expressed in the following claims.

What I claim is:

1. A machine for patting candy comprising means for continuously feeding pieces of candy, a reciprocatable rod disposed above and transversely across the path of movement of the candy for engaging and patting the candy in transit, and means for moving said candy engaging rod into and out of engagement with the candy.

2. A machine for patting candy comprising means for continuously feeding pieces of candy, a reciprocatable rod disposed above and transversely across the path of movement of the candy for engaging and patting the candy in transmit, means for moving said candy engaging rod into and out of engagement with the candy, and means for varying the rate of reciprocation of said candy engaging rod.

3. A machine for patting candy comprising means for continuously feeding pieces of candy, a reciprocatable hollow tube disposed above and transversely across the path of movement of the candy for engaging and patting the candy in transit, means for moving said candy engaging tube into and out of engagement with the candy, means for varying the rate of reciprocation of said candy engaging tube, and means for circulating a heating medium through the tube for heating said tube.

4. A machine for patting candy comprising means for continuously feeding pieces of candy, a rod disposed above and across the path of movement of the candy, means for vertically reciprocating said rod to cause the rod to move into and out of engagement with the candy in transit, means for heating said rod, and means for varying the rate of reciprocation of said rod.

5. A machine for patting candy comprising means for continuously feeding pieces of candy, reciprocatable means comprising a rod disposed above and extending transversely across the path of movement of the candy for engaging and patting the candy in transit, means for moving said candy engaging rod into and out of engagement with the candy, and means for adjusting the distance of the candy engaging rod relative to the path of movement of the candy.

6. A machine for patting candy comprising means for continuously feeding pieces of candy, reciprocatable means including a rod disposed above and extending transversely across the path of movement of the candy for engaging and patting the candy in transit, means for moving said candy engaging rod into and out of engagement with the candy, means for varying the rate of reciprocation of said candy engaging rod, and means for adjusting the distance of the candy engaging rod relative to the path of movement of the candy.

7. A candy machine comprising means for continuously feeding pieces of candy, a vertically reciprocatable frame, means for vertically adjusting said frame while the machine is in operation, a candy engageable member carried by the frame, means for reciprocating said frame, and means for regulating the rate of reciprocation of said frame.

LOUIS H. ZEUN.